(12) United States Patent
Peck et al.

(10) Patent No.: US 11,294,794 B2
(45) Date of Patent: *Apr. 5, 2022

(54) MANAGING AND MAINTAINING MULTIPLE DEBUG CONTEXTS IN A DEBUG EXECUTION MODE FOR REAL-TIME PROCESSORS

(71) Applicant: TEXAS INSTRUMENTS INCORPORATED, Dallas, TX (US)

(72) Inventors: Jason Lynn Peck, Houston, TX (US); Gary A. Cooper, Oakmont, PA (US); Markus Koesler, Landshut (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 31 days.

This patent is subject to a terminal disclaimer.

(21) Appl. No.: 17/008,418

(22) Filed: Aug. 31, 2020

(65) Prior Publication Data
US 2020/0401500 A1 Dec. 24, 2020

Related U.S. Application Data

(63) Continuation of application No. 15/981,377, filed on May 16, 2018, now Pat. No. 10,761,968.

(51) Int. Cl.
*G06F 11/36* (2006.01)

(52) U.S. Cl.
CPC ...... *G06F 11/3656* (2013.01); *G06F 11/3636* (2013.01); *G06F 11/3664* (2013.01); *G06F 11/3632* (2013.01); *G06F 2201/805* (2013.01)

(58) Field of Classification Search
CPC .......... G06F 11/3632; G06F 11/3636; G06F 11/3656; G06F 11/3664; G06F 2201/805
See application file for complete search history.

(56) References Cited

U.S. PATENT DOCUMENTS 6,324,684 B1 11/2001 Matt et al.
6,557,116 B1 4/2003 Swoboda et al.
(Continued)

OTHER PUBLICATIONS

Anonymous, Scheme for reducing a language runtime's frequency of suspend checks in the context of supporting debugger break requests, Mar. 6, 2009, ip.com, retrieved online on Nov. 11, 2021, pp. 1-4. Retrieved from the Internet: <URL: https://priorart.ip.com/IPCOM/000180319>. (Year: 2009).*

(Continued)

*Primary Examiner* — Hanh Thi-Minh Bui
(74) *Attorney, Agent, or Firm* — Charles F. Koch; Charles A. Brill; Frank D. Cimino

(57) ABSTRACT

A real-time debugger implementation maintains and manages multiple debug contexts allowing developers to interact with real-time applications without "breaking" the system in which the debug application is executing. The debugger allows multiple debug contexts to exist and allows break points in real-time and non-real-time code portions of one or more applications executing on a debug enabled core of a processor. A debug monitor function may be implemented as a hardware logic module on the same integrated circuit as the processor. Higher priority interrupt service requests may be serviced while otherwise maintaining a context for the debug session (e.g., stopped at a developer defined breakpoint). Accordingly, the application developer executing the debugger may not have to be concerned with processing occurring on the processor that may be unrelated to the current debug session.

20 Claims, 8 Drawing Sheets

(56) References Cited

U.S. PATENT DOCUMENTS

| | | |
|---|---|---|
| 6,564,339 B1 | 5/2003 | Swoboda et al. |
| 6,643,803 B1 | 11/2003 | Swoboda et al. |
| 2009/0217298 A1 | 8/2009 | Circello |
| 2013/0067133 A1 | 3/2013 | Mansell et al. |
| 2016/0378699 A1 | 12/2016 | Warkentin et al. |
| 2018/0365130 A1* | 12/2018 | Hintsala ............. G06F 11/3664 |

OTHER PUBLICATIONS

Man Li et al., "Research on Parallel Debugger in Bus-Based Multi-DSP System in Radar Data Processing", IEEE, 2013, retrieved online on Apr. 15, 2020, pp. 1-5. Retrieved from the Internet: <URL: ieeexplore.ieee.org/stamp/stamp.isp?> (Year: 2013).

* cited by examiner

MANAGING AND MAINTAINING MULTIPLE DEBUG CONTEXTS IN A DEBUG EXECUTION MODE FOR REAL-TIME PROCESSORS

CROSS-REFERENCE TO RELATED APPLICATIONS

This application is a continuation of U.S. patent application Ser. No. 15/981,377 filed on May 16, 2018, which is incorporated by reference herein in its entirety.

BACKGROUND

Embedded processors are widely used in a variety of applications and generally include processor circuitry that executes embedded code to perform desired functions. One type of embedded processor is a microcontroller which can be used, for example, to control the operation of a device or device component, such as a motor. Another type of embedded processor is a digital signal processor (DSP), which may be used, for example, in a variety of communications products, such as cellular phones. The use of an embedded processor to perform desired functions generally requires the development and debugging of a variety of concurrently executing applications with some applications taking advantage of embedded code. In many applications, the embedded code includes foreground code for performing time-critical (real-time) tasks, and background code for performing administrative or higher-level (non-real-time) tasks. Debugging of real-time code in any processor, either embedded or general purpose, has similar complications that may be addressed by concepts of the disclosed implementations. Similarly, application code may be embedded in a control system or provided by other conventional means. Conceptually, it is easier to consider embedded code in an embedded processor for the concepts of this disclosure; however, the disclosed issues and improvements are not limited to just this type of code and processor.

For certain applications, it may be particularly important to be able to debug the embedded code using real-time execution control. It may also be important to provide for real-time debug access to internal flags, registers and/or memory. The contents of such flags, registers, and memory provide the "context" of an embedded processor and the code it is executing at any given time. In normal operation, access to processor context is provided without using a debug monitor and without stopping the processor. Real-time execution control allows for the suspension of an embedded processor's execution of a given task while still allowing the processor to continue servicing other time-critical tasks. Thus, real-time execution control may allow the user of processor development and debug tools to interactively control the execution of code within the system without necessarily interfering with the processor's ability to perform time-critical tasks. For example, if embedded code is being debugged in a processor used to control a hard disk drive motor, the processor should not be allowed to stop the real-time threads/tasks that maintain the motor's functionality. Otherwise, the motor may go out of control and destroy the hard disk drive. Thus, it may be important to allow the processor to continue to execute the time-critical task of controlling the motor while the embedded instruction code is being debugged. In another example, debugging code within an active control system (e.g., cellular tower) should allow the cellular tower to maintain its core function (e.g., not drop all active calls) while allowing an application associated with a subset of connections to be analyzed (e.g., debugged).

On the other hand, if one or more real-time interrupts occur during a previously-initiated debug event, the processor context, for example, the operational state of the processor including the values of its internal memory and registers, may be subject to changes (e.g., from other functioning code). These types of changes affect the overall context and may provide spurious or misleading information to the debug host and ultimately the application developer performing the analysis. Accordingly, it may be desirable to take steps to ensure coherency of the debug context data. That is, the application developer should be able to trust the data retrieved is relative to where the debug breakpoint has been set, for example. The term "debug host" refers to a system external to but communicatively coupled to the processor(s) executing the code being executed in debug mode. For example, the debug host refers to a system that provides a user interface for an application developer performing the act of debugging. One example of a debug host is an in-circuit debugger (ICD). An ICD is a hardware device that connects to the microprocessor, for example via a JTAG or Nexus interface to allow the operation of the microprocessor to be controlled externally. JTAG is named after the Joint Test Action Group and is codified in an industry standard formally referred to as IEEE 1149.1. JTAG specifies the use of a dedicated debug port implementing a serial communications interface for low-overhead access without requiring direct external access to the system address and data buses. The interface may connect to an on-chip test access port (TAP) that implements a stateful protocol to access a set of test registers that present chip logic levels and device capabilities of various parts. Nexus is a standard formally referred to as IEEE-ISTO 5001-2003, incorporated by reference herein in its entirety. Nexus defines a standard set of connectors for connecting the debug tool to the target or system under test. Logically, data is transferred using a packet-based protocol. This protocol can be JTAG; or, for high-speed systems, an auxiliary port can be used that supports full duplex, higher bandwidth transfers.

When a user is debugging an application (or embedded system) request/response interactions, or packets may be transferred to a processor in a debug state (e.g., through the debug port). These interactions help control a debug session and may include: A) Run-time control representing that debug tools can start and stop the processor, modify registers, and single-step machine instructions. B) Memory access requests both while the processor is running and while it is paused. Access requests of a running processor may be required when debugging systems where it is not possible to completely halt the system under test. Examples include debugging an application in an active cell tower, where stopping digital feedback loops can cause undesired service interruptions. Note, disclosed Polite and Rude request types are introduced in this disclosure to further address memory access. C) Breakpoints representing that programs halt when a specified event (e.g., program counter has reached a breakpoint) has occurred. The event may sometimes be specified as a code execution address, or as a data access (read or write) to an address with a specified value. When debugging, several kinds of event tracing may be used. More details may be found in the above referenced standards which are incorporated by reference herein in their entirety.

Even though there are industry standards defining certain aspects of processor debugging capabilities and communication interfaces, external control (e.g., control from a debug host system) is typically restricted to the specific debugging capabilities "built-in" to the processor. Accordingly, more robust debug capabilities built-in to a processor may enhance the flexibility and usability for application developers to implement, test, and validate their code. This disclosure presents at least three examples of such improvements that may be used individually or collectively to assist application developers as described. More particularly, but not by way of limitation, this disclosure relates to processors having real-time execution control for debug functions to allow a) a real-time execution mode including interrupt handling to debug real-time applications, b) managing multiple real-time debug contexts, and c) maintaining a coherent debug view during multi-dimensional debugging operations. In the following Detailed Description section, each of these capabilities is independently summarized at a high level and then discussed in more detail with reference to the Figures as necessary.

SUMMARY

In a first example implementation, a computing device comprising: a processing unit; and a debug controller communicatively coupled to the processing unit and including at least one input/output interface, wherein the debug controller contains logic that when executed causes the debug controller to perform a debug monitor function, the debug monitor function configured to: recognize a first breakpoint for the processing unit in a first code section having a first execution priority, in part, by pausing the processing unit and establishing a first debug context; receive an indication that a second code section of a higher execution priority than the first execution priority requires servicing while the processing unit is halted at the first breakpoint; allow the processing unit to resume execution to service the second code section while maintaining the first debug context; and return to an execution state consistent with the first debug context, in part, by pausing the processing unit in the first code section upon completion of servicing the second code section. Note, the debug monitor may be implemented using additional hardware module logic on an integrated circuit containing the processing unit.

The computing device of this first example may be extended to further include configuration to: recognize a second breakpoint in the second code section at the debug controller; pause execution of the processing unit at the second breakpoint; store information of the first debug context on a stack; allow the debug controller to process functions of the debug monitor while at the second breakpoint; obtain information representative of a second debug context at the debug monitor; receive an indication to continue execution of the processing unit from the second breakpoint; pause execution of the processing unit upon return from the second code section to the first code section; and return control to the debug controller executing the debug monitor in the first debug context for the first code section.

In a second example implementation a method of debugging program code executing on a processor configured with a debug controller performing a debug monitor function, the program code including a plurality of code sections, each code section associated with an execution priority level, the method including: executing a first code section having a first execution priority on the processor while allowing interrupting code sections of a higher execution priority than the first execution priority to pre-empt execution of the first code section for a period of execution to complete each interrupting code section; recognizing a first breakpoint in the first code section at the debug controller; pausing execution of the processor at the first breakpoint; allowing the debug controller to process functions of the debug monitor while at the first breakpoint; obtaining information representative of a first debug context at the debug monitor, the first debug context associated with register values attributable to the first code section at the first breakpoint; receiving an indication that a second code section, of a higher execution priority than the first execution priority, attempts to pre-empt execution of the first code section while at the first breakpoint of the first code section; allowing the processor to execute for a period of execution to complete the second code section while maintaining the first debug context of the debug monitor associated with the first breakpoint of the first code section; and returning control to the debug controller executing the debug monitor in the first debug context upon completion of the second code section.

In each of the above examples, there may be support for different types of access requests referred to as "polite" and "rude." In certain implementations, polite access requests are held if any underlying execution is in progress and rude access requests are processed without honoring the second debug context.

BRIEF DESCRIPTION OF THE DRAWINGS

For a detailed description of various examples, reference will now be made to the accompanying drawings, in which.

DETAILED DESCRIPTION

Figure 1:
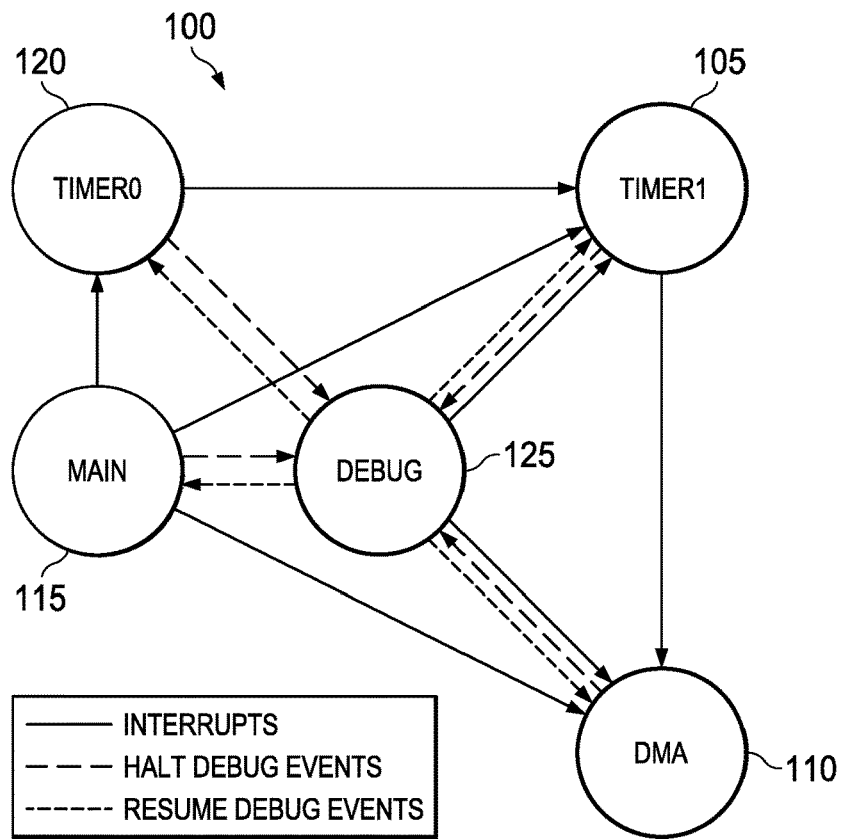
FIG. 1 illustrates a processor state diagram representing one possible example of an application having both non-real-time and real-time elements.

In the following description, for purposes of explanation, numerous specific details are set forth in order to provide a thorough understanding of the examples disclosed herein. It will be apparent, however, to one skilled in the art that the disclosed example implementations may be practiced without these specific details. In other instances, structure and devices are shown in block diagram form in order to avoid obscuring the disclosed examples. Moreover, the language used in this disclosure has been principally selected for readability and instructional purposes, and may not have been selected to delineate or circumscribe the inventive subject matter, resorting to the claims being necessary to determine such inventive subject matter. Reference in the specification to "one example" or to "an example" means that a particular feature, structure, or characteristic described in connection with the examples is included in at least one implementation.

The term "computing system" is generally taken to refer to at least one electronic computing device that includes, but is not limited to, a single computer, virtual machine, virtual container, host, server, laptop, and/or mobile device or to a plurality of electronic computing devices working together to perform the function described as being performed on or by the computing system.

As used herein, the term "medium" refers to one or more non-transitory physical media that together store the contents described as being stored thereon. Examples may include non-volatile secondary storage, read-only memory (ROM), and/or random-access memory (RAM).

As used herein, the terms "application" and "function" refer to one or more computing modules, programs, processes, workloads, threads and/or a set of computing instructions executed by a computing system. Example implementations of applications and functions include software modules, software objects, software instances and/or other types of executable code.

As used herein, the term "embedded" refers to processors and code that is "built-in" to a device in order to control that device. Embedded processors may be contrasted with general-purpose processors that are not expected to perform a particular function. Embedded code may be real-time or non-real-time but is generally intended to be tightly coupled with a particular embedded processor.

Debugging computer applications may be complicated and several tools exist to assist the developer in that effort. Application programs that execute independently from each other (and from internal operating system operations) may be "stepped through" with a source code level debugger. The source code level debugger may pause the high level application without affecting other operations taking place on the computer system. In contrast, debugging of lower level and "real-time" applications that interact directly with hardware or have a direct interface to input/output ports is likely more complicated. This is, at least in part, because low level and real-time applications may not be paused without having a direct and possibly adverse effect on the process they are controlling or possibly other processes concurrently executing on the same computer system. For the purposes of real-time processor debugging, one simple execution control technique is to stop all processor execution upon a debug halt or break event and not allow for any interrupts to be processed until execution resumes. This approach is taken in stop mode emulation schemes used in some processors. However, this does not allow for controlling the processor's execution in a real-time or embedded system.

Another method is to have a break event trigger a special interrupt which causes the processor to execute an interrupt service routine (ISR) in which the processor waits for either a command to resume execution or for an enabled time-critical interrupt to occur. This type of interrupt service routine is referred to as a "debug monitor." A debug monitor is (typically) implemented by code executed by the embedded processor after being placed in a debug state. In this disclosure, implementations of a debug monitor may include hardware logic as opposed to traditional software based debug monitors. A debug monitor may be configured to execute on a main processor or an auxiliary processor ("debug controller") that is communicatively coupled to the main processor as well as memory, registers, input/output ports, and other capabilities of the integrated circuit (IC) containing both the main processor and the debug controller. The debug monitor approach provides a form of execution control and is used in some processors in addition to the use of stop mode emulations schemes. The debug monitor (and debug controller) should not be confused with a debug host that is external to the system under test to provide a user interface to the debug session. In short, the debug host typically interfaces with the debug monitor executing on the processor, the debug controller, or a combination of both.

In a debug monitor approach, ISRs associated with the debug monitor may be configured to provide communication with the processor, the debug controller, the debug host, and ultimately the application developer by staging information in one or more registers that may be scanned. In this implementation technique, the debug controller may scan in commands and scan out results. When halted, the processor may be configured to execute the debug monitor internal to the processor (e.g., on a debug controller auxiliary processor or the main processor to the exclusion of other tasks). The debug controller, in turn, typically executes interrupt service routines (ISRs) while performing commands. Because the debug controller is internal to the processor (e.g., built-in or tightly coupled to the processor), the debug monitor scheme must occupy on-chip system resources such as program and data memory. In general, on-chip memory is very expensive and care should be taken to ensure that other system resources are not corrupted by execution of the debug monitor. Further, performance overhead due to saving and restoring context may be experienced as the debug monitor is entered and exited. In most prior art systems, interrupts (and their ISRs), even if they are time-critical, generally have to be blocked during this "halt for debug" time period.

This disclosure relates to a debug monitor approach that addresses the above issues and provides an improvement to the technical art of debugging. In particular, this disclosure describes an approach that integrates functions closely with the processor via a tightly coupled debug monitor (e.g., hardware logic as part of the debug controller) that provides functionality different from previous debug monitors. For example, when debugging a task running in a high level OS, only the task is halted for inspection/interaction, but the processing engine (e.g., a CPU) continues to execute all lower level (e.g., higher priority) functions. Also, when debugging a low-level embedded system, the debug halt event will freeze the CPU execution pipeline, stopping all code execution except that RT tasks (usually of a very high priority) may be kept "alive" even when the processor (e.g., CPU) hardware is halted. That is, any task that is of a higher priority than the halted context may be allowed continue to execute at the time it is requested to execute.

Traditional functionality of a debug monitor is typically implemented in software, however, as explained further below, the disclosed debug monitor may be implemented as a hardware system that controls the processor (e.g., CPU) when debugging. Thus, the disclosed debug monitor may represent an additional hardware module implemented on the same integrated circuit (IC) and the processor that the debug monitor controls. Conceptually, some implementations may consider the debug monitor a CPU pipeline control mechanism. Of course, the disclosed debug monitor may also be implemented as a combination of hardware and software where functions necessary to control the CPU pipeline directly may be implemented in hardware and other capabilities may be implemented in a combination of hardware and software.

Referring to the example of FIG. 1, there is shown a state-machine representation 100 of an application with both non-real-time and real-time elements. In FIG. 1, a TIMER1 state 105 and a DMA state 110 represent separate real-time sections of code that must be serviced in order to satisfy real-time deadlines. A MAIN state 115 and a TIMER0 state 120 represent non-real-time sections of code. A DEBUG state 125 represents the suspension of code execution in response to a debug event, such as a software breakpoint.

In the example of FIG. 1, interrupts are represented with solid-line arrows and may be used to change application context. Halt debug events are represented with dashed-line arrows and may be used to suspend code execution for debug. Finally, resume debug events are represented with dotted-line arrows and may be used to resume code execution after it had been previously suspended.

With continued reference to FIG. 1, one consequence of not allowing real-time sections to execute while other sections of code are being debugged may include the missing of real-time deadlines. Missed events and their associated processing may ultimately result in a corrupted system (or worse). One approach that has been taken to solve this problem is the use of software monitors (not to be confused with the software/firmware of the disclosed debug monitor) that manage the execution of code around debug events. In the case of a monitor implementation, the CPU never stops executing code; the software monitor effectively manages the execution of code around a debug event. This software monitor approach has certain potential disadvantages that include, but are not limited to: a) the overhead associated with development, b) deployment, and maintenance of such a software monitor, c) the inability of such a software monitor to utilize the entire spectrum of debug capabilities, e.g., debugger-initiated real-time CPU register and memory accesses, and d) the necessity of a communication link between the debug controller and a software monitor, possibly a separate communication link from a typical JTAG link.

Some environments, in particular real-time systems, may have the added complexity of multiple debug contexts. For example, when debugging a real-time system, real-time sections of an application should be allowed to execute while code execution is halted in a non-real-time section. In addition, it is possible for a breakpoint to halt code execution of a real-time section after first halting in a non-real-time section. In fact, setting breakpoints across different non-real-time and real-time application sections can result in halting in a non-real-time section and a plurality of real-time sections. In general, this may be thought of as interrupt driven processing, where higher priority interrupts take precedence over the breakpoint of the "lower priority" code.

To support the concept of multiple debug contexts in real-time debugging, one approach is to provide support for read-access of memory and registers (relative to one of the potentially multiple debug contexts) without requiring the processor to completely halt code execution. Allowing such memory and register accesses to be serviced against a particular debug context helps to maintain a debug session that is consistent and comprehensive. For example, the debug session provides information to a user that is "guaranteed" appropriate for an associated debug context. Of course, this guarantee may be subject to potential user-overrides as discussed below (e.g., a "rude" request). In this case, the term "debugger" is used to generally refer to the debug monitor, the debug host, and loosely to the application developer interacting with the debug session.

As should be apparent, debugging includes collecting and presenting information (e.g., in response to application developer requests). For this reason, the general term "debugger" may represent different entities supporting the act of debugging. For example, a debugger may refer to a human being issuing a command at a debug host that is reacted to by a debug monitor that may be executing on a debug controller. Alternatively, a debugger may refer to the collective components of a debug system and which component (or components) performs the actual steps to perform an action may be determined by the context and usage of the term "debugger."

In a debugging session having many possible debug contexts, support may be provided for designating interrupts at different levels of priority. As a result, interrupts occurring that are at a "higher priority" than code relative to a current breakpoint (e.g., place where processor is halted for debug) may be serviced (e.g., by executing their ISR). In this manner, the processor may be able to determine for certain cases that an interrupt needs to be serviced immediately, even if the processor was halted due to a debug event (e.g., in a lower priority code section). Servicing of the higher priority interrupt may, in fact, take place without the application developer running the debug session being aware that it is serviced. Support is also preferably provided for submitting execution control requests (e.g., run, step, and halt, requests at the direction of the application developer (or debugger)) against a particular debug context. In most implementations, real-time events (e.g., interrupts) are given higher priority than all non-real-time code sections.

One such approach to support multiple debug context involves a debug frame counter (DFC) and a debug frame register (DFR). The mechanism by which an interrupt is identified as being real-time or non-real-time can be influenced by the interrupt architecture. Such mechanisms can include one or more enable flags for each interrupt request (IRQ), or a threshold level defining the IRQ priority. In this approach, the DFC tracks the current debug context that the processor is operating in. In one implementation, the DFC decreases its count whenever the processor returns to a previous debug context after completing execution of a real-time interrupt, and increases its count when entering a new debug context by taking a real-time interrupt when previously halted. The DFC is unambiguously communicated to the debugger when the debug state of the processor is retrieved.

In this DFR/DFC real-time debug scenario, the debugger (e.g., debug host input provided to the debug monitor) will submit requests against a particular debug context by associating that request with a DFR that matches the DFC value that it retrieved with the debug state of the processor.

U.S. Pat. No. 6,324,684 to Matt et al., entitled, "Processor Having Real-Time Execution Control for Debug Functions Without a Debug Monitor," ("'684 patent"), represents one example of an approach employing a DFC and a DFR. The '684 patent proposes an execution run state machine (RSM) that supports real-time mode using a DFC. In the '684 patent, the RSM distinguishes between voluntary execution in "foreground" (i.e., real-time) code and voluntary execution in "background" (i.e., non-real-time) code.

Another approach utilizing a DFC and a DFR is described in U.S. Pat. No. 6,564,339 to Swoboda et al., entitled, "Emulation Suspension Mode Handling Multiple Stops and Starts," ("'339 patent"). The '339 patent proposes the use of a DFR as a means of ensuring a particular debug context when the processor services memory, register, and execution control requests submitted to it by a debugger.

Yet another approach utilizing a DFC and a DFR is described in U.S. Pat. No. 6,557,116 to Swoboda et al., entitled, "Emulation Suspension Mode With Frame Controlled Resource Access," ("'116" patent). Like the '339 patent, the '116 patent proposes the use of a DFR as a means of ensuring a particular debug context when the processor services memory, register, and execution control requests that are submitted to it by a debugger.

The above-referenced '684, '339, and '116 patents are commonly assigned to the assignee of the present application and are each hereby incorporated by reference herein in their respective entireties.

Some perceived or potential disadvantages to the prior art approaches, such as proposed in the '684, '339, and '116 patents, include their overall complexity, hardware cost, and failure to account for certain factors relating to the operating system (OS) context (e.g., identity of active virtual machine, kernel versus user code). With regard to the issue of undue complexity, there may be limited advantage in distinguishing whether interrupt (debug halt) events occur during real-time or non-real time processing. The use of a debug frame counter to track the current debug context may introduce an added level of complexity that may be overcome in disclosed example implementations. In particular, a debugger session may not benefit from tracking and being aware of how many contexts are below it, but instead need only be aware when the debug context changes due to the processor being halted in a new context (e.g., a change in breakpoint).

To address issues with the specific conventional implementations discussed above and to provide alternative improvements to a debug monitor portion of a real-time processor, this disclosure provides example implementations that include at least three characteristics. Firstly, a real-time execution mode is disclosed that includes interrupt handling to debug real-time applications. Secondly, the disclosed debug monitor, in some implementations, provides a debug environment implemented as a CPU pipeline control hardware module capable of managing multiple real-time debug contexts. Thirdly, the disclosed debug monitor may also provide a debug environment that is also capable of maintaining a coherent debug view during multi-dimensional debugging operations (e.g., handle multiple debug contexts within a single debug session). Any combination of these, and possibly other, improvements may be made available as required for an implementation of a real-time processor according to the concepts of this disclosure.

Real-Time Execution Mode

Real-time mode debugging ("RM debug"), in one example, allows a subset of the normal interrupts of a processor to be designated as "Real-Time" ("RT") interrupts. Interrupts designated as RT can be serviced to completion even when the processor is halted for debug.

Figure 2:
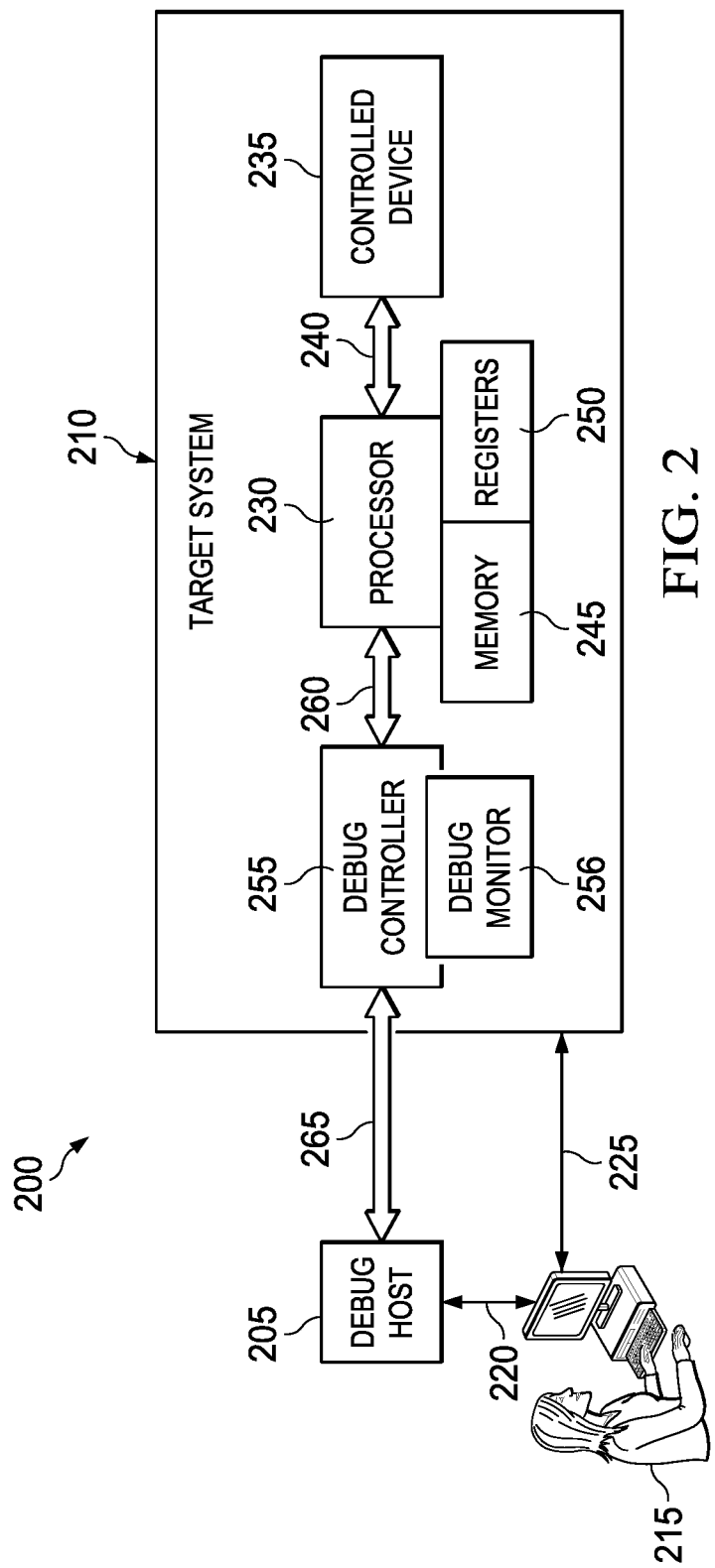
FIG. 2 illustrates a block diagram of a debug environment 200, including a user 215 (e.g., application developer performing debugging), a debug host 205, and a debug controller 255 (e.g., configured to execute debug monitor 256) in which different examples of this disclosure may be advantageously applied.

Referring to FIG. 2, block diagram illustrates one example of a debug environment 200 that may be established in accordance with the concepts of this disclosure. Debug environment 200 includes a debug host 205, and a target system 210. Target system 210 further includes a processor 230, debug controller 255, and debug monitor 256. In this example, debug monitor 256 refers to code executing on debug controller 255 to assist in controlling a debug session for code executing on target system 210. This debug session may be interactive with user 215 for example. In this example, debug monitor 256 is shown as executing on debug controller 255. However, it is possible that in some implementations portions of debug monitor 256 may execute on processor 230 and coordinate with other portions of debug monitor 256 executing on debug controller 255.

In accordance with a conventional user-interface arrangement, a user 215 may interact with debug host 205 via a user interface as illustrated by communication link 220. In some cases, in addition to "indirect" interaction with target system 210 using debug host 205, a user may interact directly (e.g., via an input/output interface) with target system 210 as illustrated by bi-directional arrow 225. Direct interaction may include physically changing settings on target system 210 via direct adjustment of controls (not shown) on target system 210 or by creating a hardware interrupt to cause a breakpoint for debugging at a certain time as opposed to, or in addition to, programming in a software determined breakpoint.

In this example, processor 230 may be, for example, an embedded processor or multi-core processor that exchanges control and other operational signals with a controlled device 235 via an interface 240. By way of example but not limitation, processor 230 may be a microcontroller and controlled device 235 may be a hard disk drive having a motor that is controlled according to signals provided by the microcontroller. Controlled device 235 may also be external to target system 210, for example an HVAC system or other device controlled by remote communication commands (e.g., commands via a communication input/output port, network interface, communication bus, etc.). Also, in the event that there are multiple cores on processor 230, there may be multiple implementations of debug controller 255 and debug monitor 256. For example, there may be a pair of debug controller 255 and debug monitor 256 with each pair associated with an individual core to allow for debugging of processes executing on that core. In this manner, it may be possible to debug applications across the multiple cores or individually on a single core.

In this example, processor 230 executes code stored in an associated memory 245 (which may be integrated within processor 230 and/or external thereto) to perform predetermined functions. In general, embedded code includes at least two categories including: foreground, or real-time code, and background, or non-real-time code. As is customary, processor 230 has certain registers 250, including debug registers, associated therewith, which may also be either integral with the processor 230 or implemented externally. As illustrated in this example, debug controller 255 may interface with processor 230 via interface 260 to gain access (read only, or read/write as appropriate) to memory 245 and registers 250 associated with processor 230. Interface 260 may be a bus within an IC when debug controller is internal to the IC containing processor 230 or may be provided using an access port (sometimes referred to as an indirect access port). In this example, debug host 205 is also illustrated as communicatively coupled to target system 210 (and debug controller 255) via interface 265. Interface 265 may be used to provide communication between debug host 205 and debug controller 255, for example, to provide user commands and obtain query output from an application developer performing a debug session on target system 210. In one implementation, interface 265 may be based upon the JTAG standard mentioned above.

Figure 3:
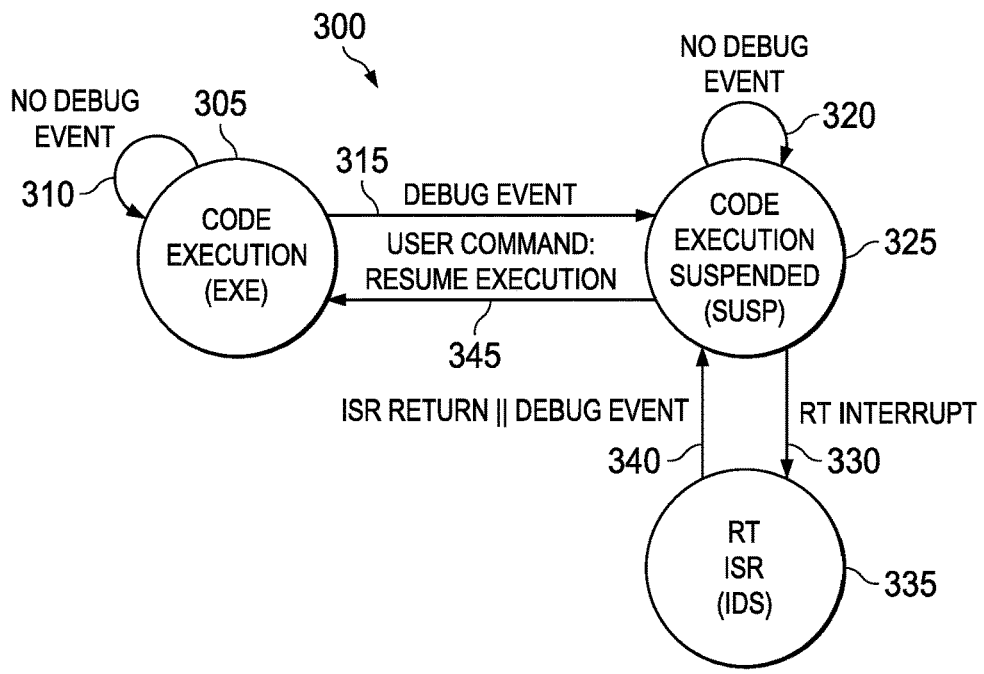
FIG. 3 illustrates a processor state diagram representing one possible example for real-time mode debugging of a system.

Turning to FIG. 3, state diagram 300 illustrates a basic operation of real-time mode debugging in accordance with one example. The EXE state 305 in FIG. 3 represents normal code execution, e.g., processor 230 is executing code from memory 245. In the absence of any debug event, code execution continues as represented by reference numeral 310 in FIG. 3.

If however, there is a debug event, e.g., a breakpoint, as represented by state transition 315 in FIG. 3, this event causes the processor to suspend code execution and enter code execution suspended ("SUSP") state 325. In accordance with state transition 320, the processor remains in SUSP state 325 for a period of time where no additional debug event occurs and no higher priority ISR needs to be serviced. On the other hand, when a higher priority interrupt (e.g., real-time interrupt with associated ISR) occurs while the processor is in SUSP state 325 associated with the lower-priority code causing the original suspension, the processor may be caused to resume code execution as represented by state transition 330. Once resumed, certain implementations ensure that the only code executed may be the ISR associated with the higher priority interrupt and other code is not executed at this resumption of processing. That is, in some implementations, resuming execution occurs only for ISRs that are a higher priority than the priority associated with a code portion for which the processor is currently in SUSP state 325. Real-time code portions will almost always (if not always) be associated with a higher priority than any non-real-time code portions and different non-real-time code portions may have different relative priorities.

With continued reference to FIG. 3, the act of transitioning from SUSP state 325 to Interrupt during Debug Suspend (IDS) state 335, for example, leaving SUSP state 325 due to an ISR of higher priority (e.g., RT interrupt), may be logged by processor 230 or debug controller 255 (depending on the implementation details). Also, at this state transition, attributes reflecting the current processor context (e.g., register and memory values) may be placed on a stack stored in memory 245 or memory (not shown) internal to debug controller 255. The "current processor context" that may be pushed on the stack may include an indication that the CPU resumed execution from a "halted" state. This indication may be useful to determine that code execution has returned back to a location that was "awoken" by a higher priority processing task. As used herein, the term "stack" is used and understood in a customary sense with respect to software programming models. Accordingly, a stack refers to a mechanism (data construct) of storing data entries in an ordered manner, such that entries may be added or removed sequentially from the top or bottom. In some implementations, the stack used for storing context information may be implemented using a standard functional/application stack to store the current execution context. Using the standard functional/application stack for debug context information may allow for standard behavior with respect to an ISR that preempts the current task/thread.

In this example, the data entries of a stack may be the contents of processor registers and/or locations in memory reflecting the current operational state of a processor with respect to an associated code portion. Furthermore, as described above and as used herein, the term "context" shall be used to refer to a collection of information (flags, register values, control signal levels, memory contents, etc.) as it exists at a given point during operation of a processor as it executes code.

The context may be thought of as a state of the processor in conjunction with a code portion being subject to interrogation by a debugger relative to a SUSP state 325 of the processor. Preservation of attributes for a processor context may allow for restoration of that processor to the associated particular operational state. A "context stack" or "debug stack" shall be understood herein to refer to a usually ordered and sequential storage of context entries each reflecting the operational state of a processor at an associated particular time (e.g., specific breakpoint). Depending on the implementation, this may be a dedicated stack or an existing stack that is augmented with additional entries.

In the present example implementation, it is not required to make a distinction between halting in real-time code (transition 315) and halting in non-real-time code (transition 330). Likewise, there is no distinction between resuming code execution while halted in real-time code (transition 340) and resuming code execution while halted in non-real-time code (transition 345). It is believed that such distinctions are not necessary because halting in real-time mode will by definition break the real-time nature of that particular real-time process. However, because disclosed example implementations do not completely suspend the processor (e.g., execution continues for higher priority interrupts) an improved, and more closely reflective of real-time, debugging session may be provided.

Managing Multiple Real-Time Debug Contexts

The addition of processor context to a stack storage mechanism in response to a debug event (e.g., correlated with state transition 330) may help to facilitate future halts (or other debug events) related to returning from RT ISR IDS state 335 to SUSP state 325. This return transition is represented by state transition 340 in FIG. 3. For example, when servicing of an RT ISR (or simply higher priority interrupt) in IDS state 335 completes, or when a new debug event is encountered, the processor may once again suspend code execution by returning to SUSP state 325.

Having returned to SUSP state 325, the debug session with the application developer may be continued. In some cases, the application developer may not even be aware of the transition to and back from IDS state 335. Continuing with the debug session, the application developer may instruct (e.g., by a step, go, or, run command issued via the debug host) the processor to resume code execution. This may cause a return to EXE state 305 as represented by state transition 345 in FIG. 3 (assuming no further ISRs are pending). For example, this may occur as a result of the application developer requesting a "run" or "step" operation as part of an "asynchronous" debugger session. Asynchronous is used here to indicate that the timing of the debug session is relative to the perspective of the application developer interacting with a debug host and may not be reflective of the timing of the processor. This perspective is, in part, because the processor has continued to service higher priority requests while the application developer's perception of application run-time is suspended (e.g. perceived to be at SUSP state 325) in the debug session.

One implication of the scenario depicted by the state diagram of FIG. 3 is that when the processor is in SUSP state 325, accessing the debug context (i.e., internal registers, memory and so on) returns a true snapshot; that is, in SUSP state 325, execution state changes and data queries (e.g., register and memory values) can be made against a known context. On the other hand, when a processor is in IDS state 335, debug access can "confuse" the debugging tools and users, because entry into and out of state 335 is asynchronous to user control or request. Execution state changes may cause misleading results to an application developer's query of information in the system, because the values of system resources may be dynamic. Accordingly, capabilities such as "rude" and "polite" information requests may be provided to assist the application developer in confidence of data returned. Rude and polite information requests with respect to maintaining a debug context in real-time processors are presented in more detail below.

Coherent Debug View During Multi-Dimensional Debugging Operations

As will be apparent to those of ordinary skill in the art, having the benefit of the present disclosure, real-time mode debugging introduces certain cases that can result in confusing results when interrogating the system. An executing interrupt service routine (ISR), such as an RT ISR, will likely temporarily change some system resources such as registers and memory. Reading these system resources while they are in their temporary states does not provide a coherent view of the halted state of the system. Also, a user instructing the debug controller to change the values of any resource that might be actively in use by a real-time interrupt service routine may result in undesirable system operation. This is in part, because the modification may occur asynchronously to the interrupt service routine flow and not reflect the intended action of the user requesting the change. To be clear, the user requested the value to be changed for a certain context (i.e., context of debug breakpoint) and not the running ISR. Accordingly, any request to change resources may be delayed until a temporary context change has completed. That is, the system has completed the ISR and returned to the proper debug context at state 325. To address these issues, a real-time debug system may be configured to provide the ability to ensure that debug accesses and execution requests are only applied when the processor is in a halted state (e.g., state 325). Such accesses are referred to as "Polite" accesses.

Figure 4A:
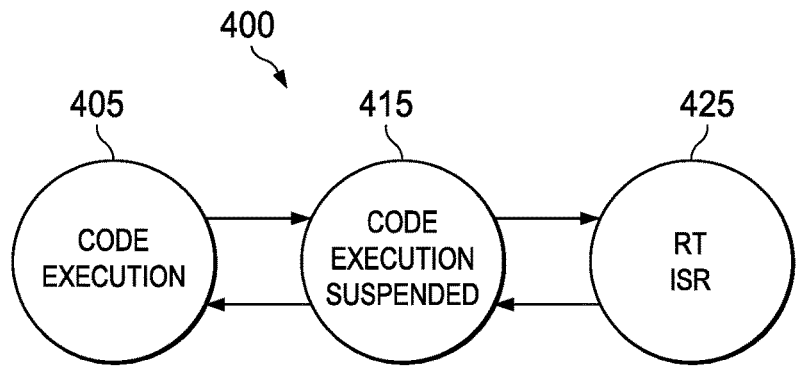
FIG. 4a illustrates a state diagram and FIG. 4b illustrates a program flow diagram depicting processor operation associated with debug and real-time interrupt events for an example program flow within a possible debug session on a processor configured with real-time debug capabilities, according to one or more disclosed examples.
Figure 4B:
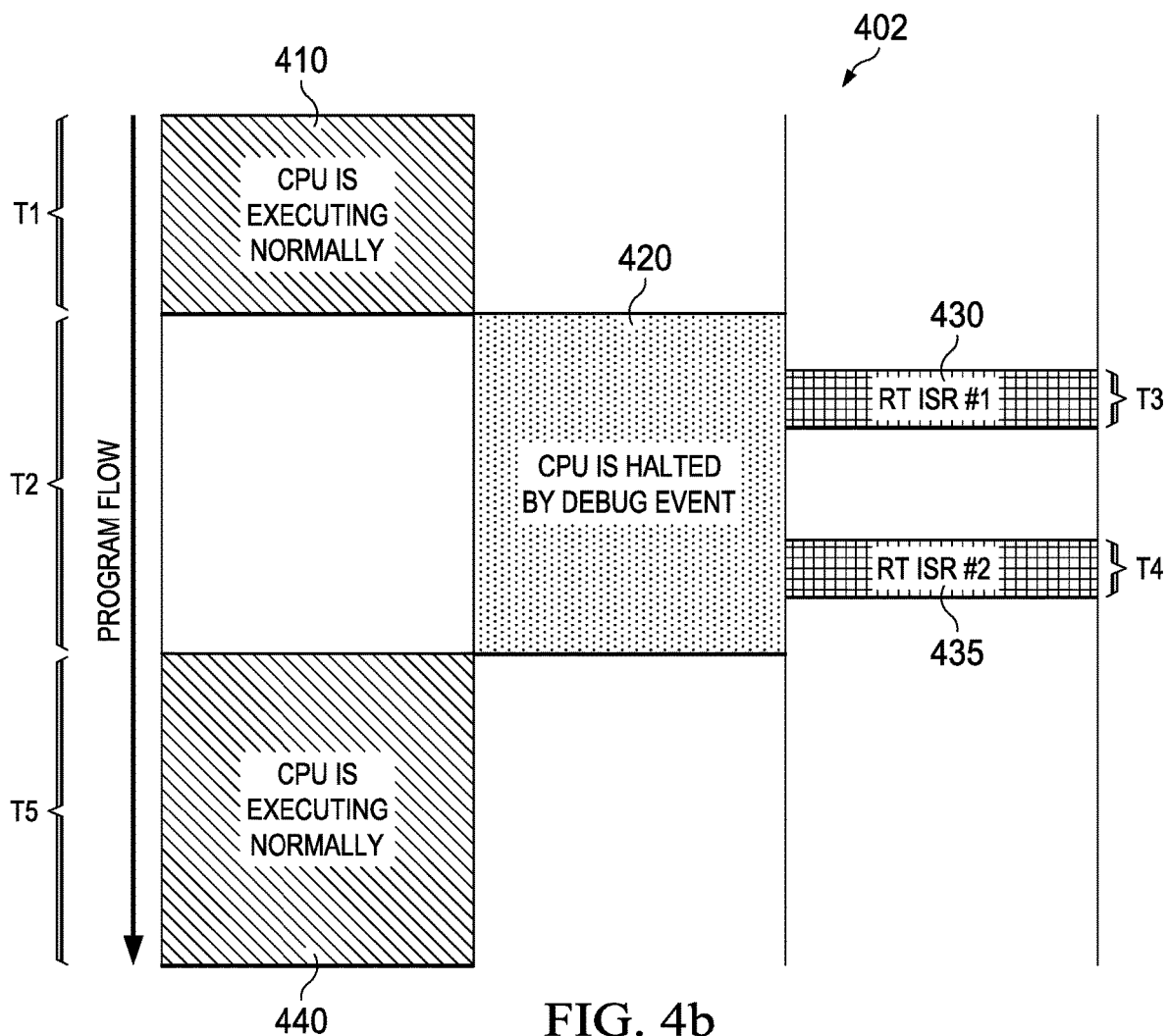

FIG. 4a illustrates state diagram 400 and FIG. 4b illustrates a program flow diagram 402 which together depict how events may take place in a debugging session by allowing RT ISRs to execute while a CPU is halted at a debug event. References to "polite" and "rude" access requests are also explained relative to this program flow. The execution depicted in FIGS. 4a and 4b begins during a first period of program flow designated T1 in FIG. 4b, during which the processor is in code execution state 405 of FIG. 4a. In state 405, the processor is executing normally, as represented by block 410.

Following program flow interval T1, the processor is halted by a debug event and enters a suspended state 415 of FIG. 4a, during which it is halted, as reflected by block 420 in FIG. 4b, corresponding to program flow interval T2. In the depicted example, the overall duration of this halted state at block 420 is designated T2 in FIG. 4b. Throughout the time period corresponding to T2, "polite" debug accesses and execution requests may be blocked for periods T3 and T4 because, as indicated by blocks 430 and 435, the processor is executing RT ISR 1 and RT ISR 2, respectively. Accordingly, "polite" requests may be serviced in the slices of time in T2 that occur before, in between, and after T3 and T4. In contrast, a "rude" request may be serviced at any time during T2 and may return unexpected values if the access block is overridden by the user using the rude request. Specifically, in time periods T3 and T4, there is no guarantee that the information returned to the user of a rude request is accurate to the context associated with state 415 and block 420 because further execution may have altered the values queried or may inappropriately change a value in-use by an ISR. In general "rude" requests are serviced immediately at the potential peril or confusion of the user and system. To summarize, a polite request provides information relative to the perceived context of the processor by not servicing it when not appropriate and a rude request is serviced without regard to correctness or context. Said another way, a polite request made from the debugger relative to a halted context at block 420 will only be serviced when the processor is in suspended state 415 and any requests made from block 420 that occur for the intervals where the processor is in state 425 (e.g., servicing either RT ISR #1 at T3 or RT ISR #2 at T4) will be held or blocked as appropriate. For example, such requests may be held for a timeout period and, if not serviced within the time period, blocked so that control may be returned to the user with an informative message. Upon the receipt of the informative message the user may choose to issue a rude request subject to the restrictions/conditions set forth herein with respect to rude requests.

Continuing with the example of FIGS. 4a and 4b, while the processor is halted in suspended state 415 (block 420), a first real-time interrupt service request (RT ISR #1) is received. This transitions the processor to an interrupt service request RT ISR state 425 of FIG. 4a, during which the processor executes the appropriate interrupt service routine, as reflected by block 430 in FIG. 4b. When the processor is in RT ISR state 425, "Polite" debug accesses and execution requests (i.e., those associated with block 420) are blocked or held till a proper time period when neither RT ISR #1 or RT ISR #2 are executing. As shown in FIG. 4b, the processor executes the appropriate ISR during a program flow interval T3 that falls within a portion of interval T2. Upon completion of RT ISR #1, the processor returns to state 415.

The example of FIGS. 4a and 4b further depicts a second real-time interrupt service request (RT ISR #2), represented by block 435 in FIG. 4b, with it being understood by those of ordinary skill that any number of such RT ISRs could occur within the suspended interval T2. In this example, RT ISR #2 takes the processor once again from suspended state 415 to RT ISR state 425. As shown, the processor remains in RT ISR mode 425 throughout the servicing of the second RT ISR at block 435, during program flow interval T4. In this example, RT ISR #1 and RT ISR #2 are shown to not have any overlap in duration, but that is only for simplicity of explanation. The flow and transitions of FIGS. 4a-b could result in many levels of nested and overlapping interrupts depending on how a system is configured and operating.

To complete the discussion of FIGS. 4a and 4b, upon completion of the "debug" event represented by block 420, the processor is allowed to return to normal code execution state 405 (represented in FIG. 4b by block 440 and program flow interval T5). This completion may be the result of a user instructing the breakpoint to be released, for example, by issuing a run, go, or step command. Normal flow can continue until a next debug event is detected at which point a debug controller may again initiate a flow and state change progression as depicted in FIGS. 4a and 4b.

In the current example, the real-time debugging mode system provides a toggle that allows debug accesses and execution requests to bypass the "Polite" protections; these are sometime referred to as "Rude" accesses. Invoking such a bypass (user override) may be reserved for "user beware" situations such as trying to interact with a processor that has entered: a run-away condition while executing a real-time interrupt service routine, an extended loop, or a condition waiting on some sort of device time-out, for example.

Managing Multiple Real-Time Debug Contexts

As briefly mentioned above, those of ordinary skill will also appreciate that it is also possible to encounter a debug halt event while executing a real-time interrupt service routine, e.g., the ISR code may have a software breakpoint. Such halt events must be serviced. One consequence of this need may be that the processor might be halted at multiple points—the original halt location and a subsequent halt location within the interrupt service routine (e.g., nested halts). Such a change in the active halt location is referred to as a debug context change. Those of ordinary skill will appreciate that it is possible to have many debug contexts stacked (or nested), because multiple real-time interrupt service requests may encounter debug halt events. The depth of this context stack can change dynamically as more RT ISRs are encountered and halted RT ISRs are resumed and execute to completion.

In order to stay synchronized with debug tools, a real-time debug environment (e.g., debug monitor 256 representing functionality of debug controller 255 and their interaction with debug host 205) preferably notifies the tools any time the debug context changes. That is for example, when a subsequent halt has been encountered, or an older halt is now at the top of the stack due to all higher level halts being cleared. When this indication of context change is detected by the debug tools, the state of the new active context can be obtained and presented to a user via the debug host, for example. This may be considered a "refresh" of the debug monitor with respect to exiting one context and entering the next applicable context.

Figure 5A:
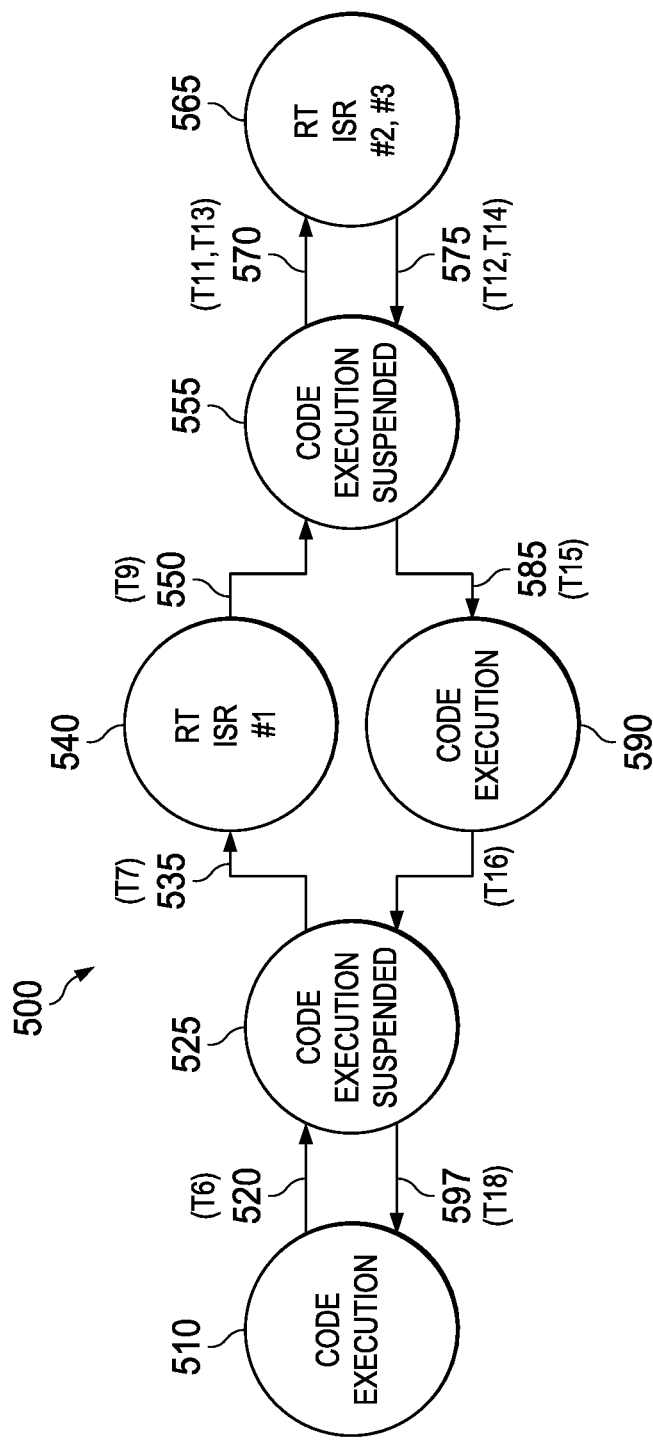
FIG. 5a illustrates a state diagram (500) and FIG. 5b illustrates a program flow diagram (502) depicting processor operation associated with debug and real-time interrupt events for a second example program flow within a possible debug session operating on a processor configured with real-time debug capabilities, according to one or more disclosed exam pies.
Figure 5B:
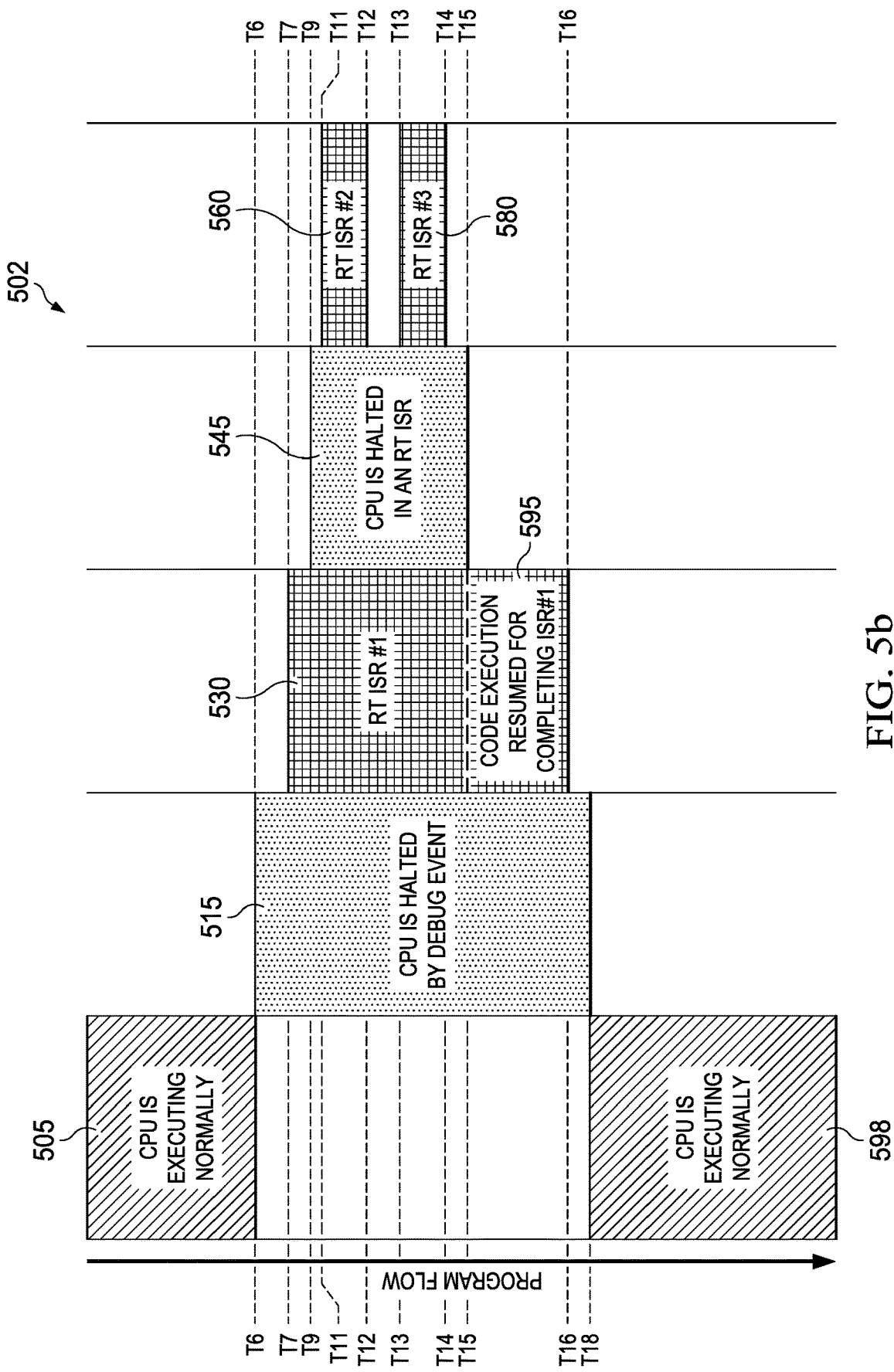
Figure 6:
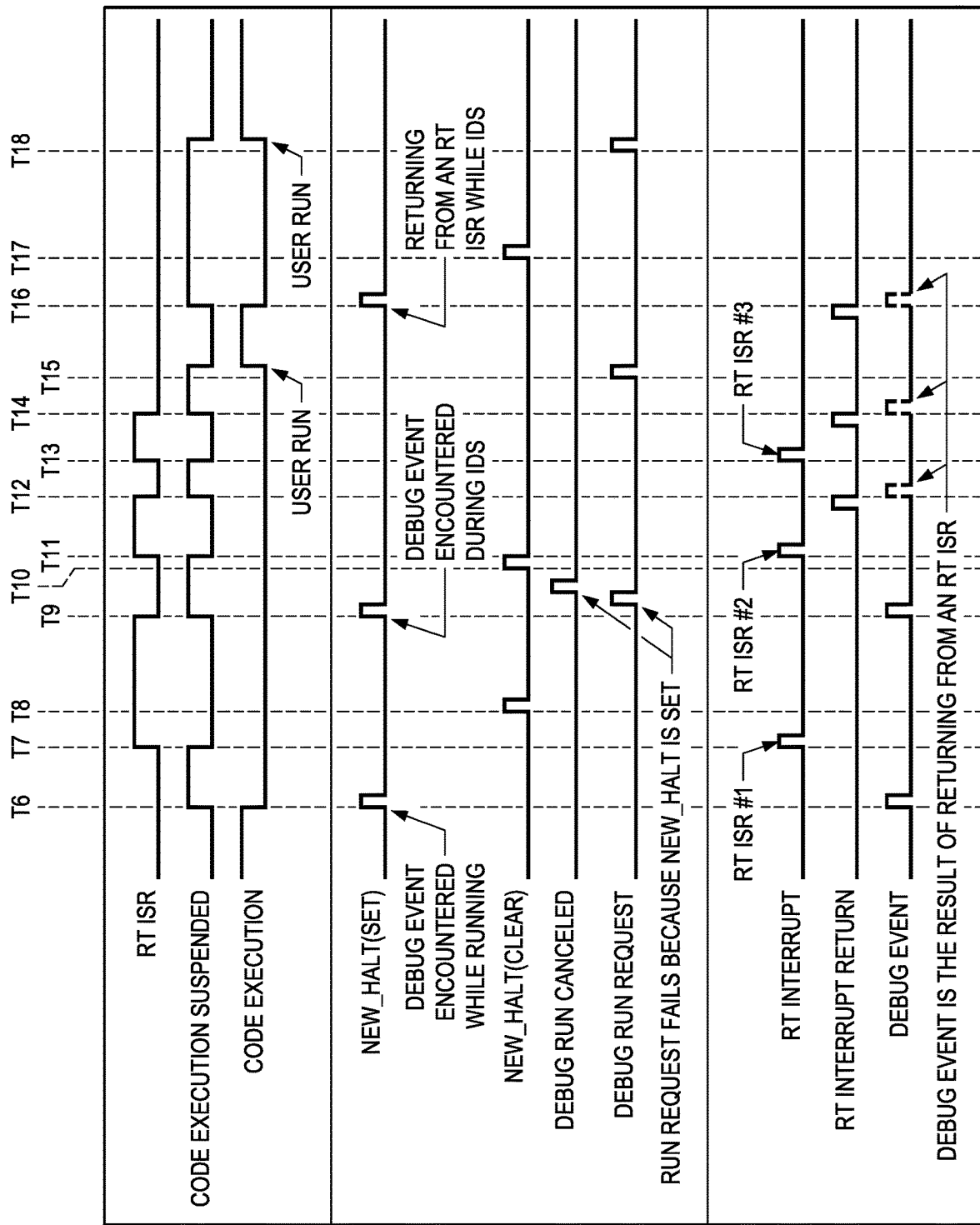
FIG. 6 illustrates a timing diagram of an example of possible logic signals that may be present in a processing system configured to handle debug and real-time interrupt events in accordance with one or more disclosed examples.

In order to stay synchronized with debug tools, and with reference now to FIGS. 5 and 6, an example of how a real-time debug environment and system may notify the tools any time the debug context changes is described. FIGS. 5a and 5b illustrate, respectively, a flow diagram 500 and a program flow diagram of real-time mode debugging in accordance with one example. In FIG. 6, there is shown a signal timing diagram depicting the real-time execution state, debug context and control, and CPU events associated with one possible real-time debugging session. The signal definitions for the timing diagram of FIG. 6 are as follows:

TABLE 1

| | |
|---|---|
| RT_ISR | When asserted, corresponds to the processor resuming execution to service a real-time interrupt service request (RT ISR). |
| Code Execution Suspended | When asserted, processor execution has suspended. |
| Code Execution | When asserted, CPU is executing code. |
| NEW_HALT Set | Assertion indicates entry into a new debug context and causes a NEW_HALT flag to be set (e.g., a point in time for the debug monitor to establish a new debug context, or take over one that has been setup by the processor for the debug monitor to process). |

TABLE 1-continued

| | |
|---|---|
| NEW_HALT Clear | Assertion indicates that debugger (e.g., debug monitor and debug controller) has become aware of the new debug context and causes the NEW_HALT flag to be cleared (e.g., debug monitor has completed a collection of or, a creation of a new debug context). |
| Debug RUN Canceled | Assertion indicates a debugger-initiated RUN request has been canceled. |
| Debug RUN Request | Assertion indicates that the debugger has submitted a RUN request. |
| RT Interrupt | Assertion indicates that an interrupt designated as real-time has been acknowledged. |
| RT Interrupt Return | Assertion indicates a return from an interrupt that was designated as real-time at the time it was acknowledged. |
| Debug Event | Assertion indicates a request to halt the processor, e.g., for a breakpoint, a return from an RT ISR, or a user halt request. |

In FIGS. 5a, 5b, and 6, an example execution sequence is shown in various forms beginning with a Code Execution phase 510 (FIG. 5a) in which the processor 230 is executing normally, as represented by block 505 in FIG. 5b. During this time, which precedes time T6 indicated in FIGS. 5a, 5b, and 6, the fact that the processor 230 is in a code execution state 510 (FIG. 5a), is reflected by the asserted level of the Code Execution signal in FIG. 6.

As in the previous exemplary scenario of FIGS. 4a and 4b, at time T6 in the scenario of FIGS. 5a, 5b, and 6 the processor 230 is halted by a debug event, as represented by block 515 in FIG. 5b. This event is reflected by assertion at time T6 of the Debug Event signal shown in FIG. 6. The debug event also causes assertion of the NEW_HALT Set signal, thereby setting a NEW_HALT flag, implemented as a memory or register location within the target system 210. At the same time (T6), the Code Execution Suspended signal is asserted, and the Code Execution signal is de-asserted, as shown in FIG. 6. At time T6, the processor state transitions (reference numeral 520) from Code Execution state 510 to Suspended state 525.

Following time T6, after the processor has been halted due to a debug event, a real-time interrupt service request (RT ISR #1, block 530 in FIG. 5b) occurs, at the time designated T7 in FIGS. 5a, 5b, and 6. The RT ISR #1 is initiated with assertion of the RT Interrupt signal, shown at time T7 in FIG. 6. RT ISR #1 occurring at time T7 causes a processor state transition (reference numeral 535 in FIG. 5a) from suspended state 525 to a RT ISR service state 540. As shown in FIG. 6, occurrence of RT ISR #1 at time T7 causes the Code Execution Suspended signal to de-assert and the RT ISR signal to assert, thereby enabling the processor to service the RT ISR.

The NEW_HALT (clear) signal is asserted at time T8 (FIG. 6 only), causing a reset of the NEW_HALT flag and reflecting that the NEW_HALT flag, set at time T6 by assertion of the NEW_HALT set signal, has been read by the debug controller 255. Note that T8 is not shown in FIGS. 5a of 5b, because the occurrence of the context stack being read by the debug controller 255 is an event not related in time to any state change event shown in FIG. 5a or 5b.

In the example of FIGS. 5a, 5b, and 6, a next event to occur is a further debug event (block 545 in FIG. 5b) commencing with assertion of the Debug Event signal at time T9. The debug event at time T9 leads to assertion of the NEW_HALT (set) signal, assertion of the Code Execution Suspended signal, and de-assertion of the RT ISR signal, as shown in FIG. 6. Thus, at time T9, processor 230 goes through state transition 550 from RT ISR state 540 to another Code Execution Suspended state 555, this time the suspension occurring during an execution of a real-time interrupt service routine as shown at block 530 (RT ISR #1). Because the debug event at time T9 occurs during servicing of RT ISR #1, the debug event at time T9 again causes assertion of the NEW_HALT (set) signal, assertion of the Code Execution Suspended signal (hence the transition 550 to state 555 in FIG. 5a), and de-assertion of the RT ISR signal (see FIG. 6).

At time T10, the NEW_HALT (clear) signal is asserted, causing a reset of the NEW_HALT flag and reflecting that the NEW_HALT flag, set at time T9 by assertion of the NEW_HALT set signal, has been read by the debug controller 255.

In accordance with one aspect of the present example, in the period between times T9 and T10 in FIG. 6, it can be seen that the Debug Run Request signal is asserted, followed immediately by the Debug Run Canceled signal. This reflects an example situation wherein the RUN request fails or is denied due to the NEW_HALT flag having been set at time T9 and not reset prior to the Debug Run Request being issued.

With continued reference to the illustrative example of FIGS. 5a, 5b, and 6, the next event shown to occur is another real-time interrupt service request, RT ISR #2, occurring at time T11 and represented by block 560 in FIG. 5b. With the occurrence of RT ISR #2, the processor transitions from Code Execution Suspended state 555 to a real-time interrupt service routine (RT ISR) state 565, as represented by state transition 570 in FIG. 5a. This, in turn, leads to assertion of the RT ISR signal (FIG. 6), such that the real-time interrupt can be serviced, as well as de-assertion of the Code Execution Suspended signal, reflecting transition 570 from state 555 to state 565.

In the example of FIGS. 5a, 5b, and 6, it is shown that the processing of RT ISR #2 concludes prior to time T12, as reflected in the assertion of the RT Interrupt Return signal. Thus, at time T12, the RT ISR signal is de-asserted, and the Code Execution Suspended signal is reasserted, reflecting the transition 575 of the processor state from RT ISR state 565 back to Code Execution Suspended state 555. Thus, the processor is at Code Execution Suspended state 555.

A next event depicted in the example of FIGS. 5a, 5b, and 6 is a third real-time interrupt service request (RT ISR #3) as indicated by block 580 in FIG. 5b. The RT Interrupt signal reflecting RT ISR #3 is asserted at time T13. This leads to the transition 570 (for a second time) of the processor from Code Execution Suspended state 555 back into RT ISR state 565.

As shown in FIGS. 5a, 5b, and 6, the processing of RT ISR #3 concludes slightly before time T14, as reflected in the assertion of the RT Interrupt Return signal. Thus, at time T14 (the trailing end of assertion of the RT Interrupt Return signal, the RT ISR signal is de-asserted, and the Code Execution Suspended signal is reasserted, reflecting transition 575 (for a second time) of the processor state from RT ISR state 565 back to Code Execution Suspended state 555. Thus, the processor is at Code Execution Suspended state 555.

Continuing with FIGS. 5a, 5b, and 6, the processor remains in Code Execution Suspended state 555 from time T14 until a user request to resume execution (assertion of the Debug RUN Request signal as shown at time T15 in FIG. 6). This is also shown by the leading edge of assertion of the Debug RUN Request signal starting at time T15 that causes the transition 585 of the processor state from Code Execution Suspended state 555 to a Code Execution state 590. This same period is also reflected by block 595 in FIG. 5b.

At time T16 in FIG. 6, there is an assertion of NEW_HALT (set) signal. In this instance, NEW_HALT is set to indicate the return from RT ISR #1 while the CPU is still halted (i.e., as shown with block 515 in FIG. 5b). This return from RT ISR #1 is reflected in a transition from Execution state 590 to Code Execution Suspend 525 (that was previously a halt position) and returns to the context that was set based on the original debug event occurring at time T6. That is, NEW_HALT is set because we are returning from an RT ISR that itself created a new debug context. Thus, a context change is required to prepare the debug context (i.e., return it to what it was) for a user interaction in block 515 of FIG. 5b. This can also be thought of as popping the stack containing the debug context to retrieve the next applicable debug context.

The NEW_HALT (clear) signal is asserted at time T17 (only shown in FIG. 6), causing a reset of the NEW_HALT flag and reflecting that the NEW_HALT flag, set at time T16 by assertion of the NEW_HALT set signal, has been read by the debugging software (i.e., debug monitor). That is, the assertion of the NEW_HALT (clear) signal reflects the fact that the debug monitor is aware of and acknowledged that it must retrieve (or has retrieved) the context information from the stack containing the context.

As shown in FIG. 6, at time T18, a Debug RUN Request is issued/asserted, such that the processor transitions from Code Execution Suspended state 525 to Code Execution state 510, as represented by transition 597 in FIG. 5a. At this time, the processor resumes normal execution, as represented by block 598 in FIG. 5b.

Recapping, in FIGS. 5a and 5b, a scenario is illustrated in which a debug halt event is encountered while the processor is servicing a real-time interrupt service request (RT ISR) after already having reached a debug event. In FIG. 5b, this occurs at time T9, when a debug halt is initiated due to assertion of Debug Event signal (see FIG. 6) as represented by block 545 in FIG. 5b. Such a halt event must be serviced and causes creation of a new debug context (and a corresponding push to the stack storing the debug context). An artifact of this is that the processor and debug monitor are now concerned with halts at multiple points—the original halt location (time T6) and a subsequent halt location (time T9), which occurs during servicing of RT ISR #1 (blocks 530 plus 595). This change in active halt location is referred to as a debug context change. In fact, it is possible to have many debug contexts stacked, because multiple RT ISRs may encounter debug halt events. The depth of this stack of debug contexts changes dynamically as more RT ISRs halt and halted ones are resumed and execute to completion.

In order to present a coherent debug environment (e.g., debug monitor 256 working in coordination with a debug controller 255 and debug host 205), the real-time debug mode (RM) for the debug system of the present example may notify supporting debug tools any time the debug context changes. That is, for example, a different debug halt event has been encountered, or an older halt is now represented by an active stack entry due to all higher-level halts being cleared. See, for example, times T9 (representing a debug halt encounter) and T16 (representing a return to a previous debug halt location) in FIGS. 5a and 5b. When this indication is detected by or provided to the debug tools, the state and information with respect to the newly active context (which may be a return to an old context) can be presented to the user, for example, by presenting information on a user-interface associated with debug host 205.

In the illustrative system, debug events that halt processor operation (e.g., breakpoints, triggers, watch points, or other user commands) cause execution to suspend. When the processor is halted, debug events that resume operation (e.g., triggers, user commands) cause execution to resume. A real-time interrupt service request (RT ISR), i.e., any ISR that must be serviced while the processor is halted by a debug event, will cause the halted processor to run (but not necessarily in a code execution state). Once the processor resumes from a halted state to begin servicing a RT ISR, if no breakpoints are encountered while servicing that RT ISR, then no new debug contexts will be created. Accordingly, execution of RT ISRs with no breakpoints may not be presented or apparent to the user.

Some functional characteristics for the RM system of the present example are summarized as follows:

A register bit field (EXMODE) may be provided to configure the debug controller 255 for real-time debugging mode operation (e.g., RM functionality). Debug events that halt operations (breakpoints, triggers, user commands) may cause execution to suspend. When halted, Debug Events that resume operation (triggers, user commands) typically cause execution to resume.

An RT ISR may be thought of as any ISR that is being serviced while the processor is halted by a debug event. When the processor is executing normally (no thread/task/ISR is under debug halt), then none of the interrupts in the system are required to be considered RT ISRs. When operating in real-time debug mode (e.g., executing RM functionality), any interrupt designated as an RT ISR (or higher priority than code associated with the current debug context) will cause a halted processor to resume. The method for designating RT interrupts may be implementation-specific, as would be apparent to those of ordinary skill in the art having the benefit of the present disclosure.

When operating in RM, other interrupt masks for RT interrupts may be ignored when halted, and the resume boundary may be the first instruction of the highest priority RT interrupt that is currently flagged as pending. Once a processor resumes from being halted to begin servicing an RT interrupt, normal interrupt masking and priority may be honored until all outstanding interrupt requests are serviced and the processor returns to the debug halted state.

A flag (NEW_HALT) may be used to indicate that a new debug context is active. That is, we have entered a new debug context for the first time or we have returned to a previous context by completing execution of a code portion associated with a context immediately subsequent to the context for which we are returning. In this manner, NEW_HALT is asserted by processor hardware when the debug context changes (i.e., one is added or one is cleared from the stack containing the debug context). When NEW_HALT is asserted, a new debug context may be pushed onto the stack containing the debug context. Alternatively, NEW_HALT could be asserted to indicate that the halt at the current stack pointer has been cleared and the halt associated with the next context on the stack is now active (e.g., a pop of the stack). The NEW_HALT flag is de-asserted upon the debug monitor completing its manipulation of the stack with respect to the debug context change.

If a new debug context is active before the processor is able to act on the debug command, the debug request is canceled. A flag CANCEL_EXE may be used to indicate that a debug request has been canceled. If a new debug context is active before the processor is able to act on an indirect access port request, the indirect access port request may be canceled. A flag CANCEL_IAP may be used to indicate than an access port interface request has been canceled.

A flag MEM_IGNORE_CTXT may be used to direct a debug monitor as to how the indirect access port is coordinated with the processor regarding data request accesses (e.g., memory, CPU register, etc.) and the execution of RT interrupts. When de-asserted with the default state reflecting a "Polite" request, all debug data access requests are held pending while any underlying RT ISR is executing. That is, the access request may wait until the underlying code returns to the current halted state and all information should be accurate with respect to the current debug context. Any pending debug request is canceled (by hardware) when the debug context changes (i.e., a new context is active presumably at a different halt location with respect to code execution).

Distinguishing from "Polite" requests, when the MEM_IGNORE_CTXT is asserted the debug monitor is informed to make a "Rude" request. For a rude request, all debug access requests (e.g., register or memory values) are initiated regardless of the execution state of the processor. Any system inconsistencies or errors that might result from a collision between a debug access and the state of an executing RT ISR should be considered by the user before requesting an access that ignores the RT state. "Rude" requests may be desirable, for example, when a "Polite" request is not serviced within a certain amount of time (i.e., experiences a time-out). As mentioned above, users must be considerate of the fact that rude requests may not return information accurate with respect to the current debug context.

Figure 7:
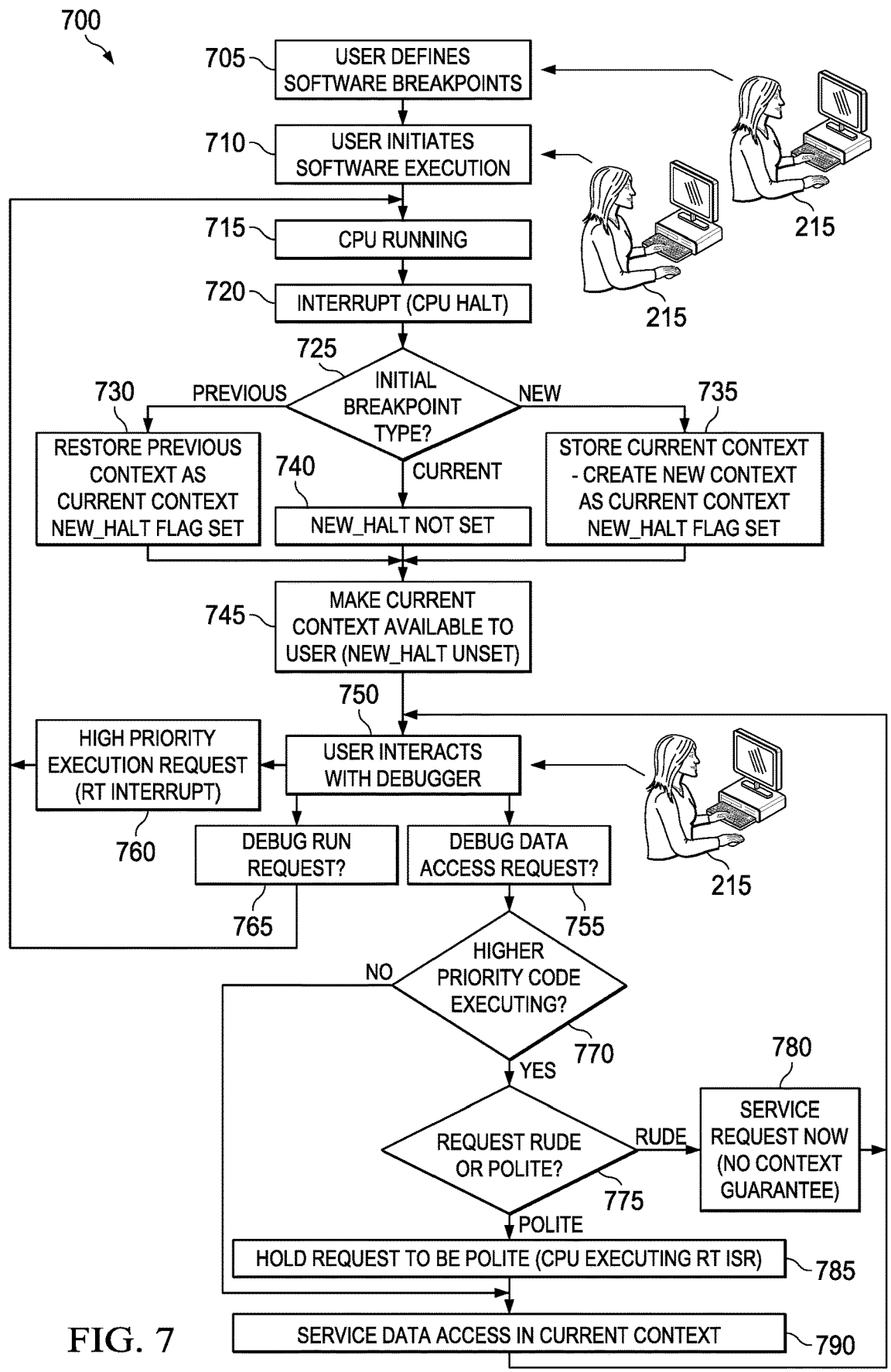
FIG. 7 illustrates a flowchart depicting an example flow, from the perspective of the user, of interacting with a processor equipped with capabilities in accordance with one or more disclosed examples.

Referring to FIG. 7, there is shown a flow diagram 700 illustrating operation within a debugging environment in accordance with this disclosure. Flow diagram 700 begins from the perspective of the user 215 interacting with a processor equipped with capabilities in accordance with one or more disclosed examples. As shown in FIG. 7, it is customary for the purposes of debugging for a user 215 to establish one or more debugging events such as breakpoints within the software/firmware being debugged, as represented in FIG. 7 by block 705. Thereafter, user 215 initiates a debugging session by allowing the system to execute the software (or firmware), as represented by block 710.

Execution of the software places the processor (CPU) in a running state, as represented by block 715. In the course of execution, the CPU must be responsive to certain events, including the above-noted breakpoints established by user 215, as well as real-time interrupt service requests (RT ISRs). Block 720 represents the CPU's recognition of the occurrence of an interrupt representing a breakpoint encountered in the code being executed and the CPU halts execution.

Upon halting at block 720, it is determined what type of breakpoint the CPU has been halted at. In this example, there are three possible options as indicated by decision 725. A first option from decision 725 is a "New" breakpoint. In this example, a new breakpoint represents a breakpoint that the CPU has not previously been halted at for this debug session. In the case of a new breakpoint, flow continues to block 735 where a current context (if any) is stored and a new context, which will become the current context, is created. In this flow path, the NEW_HALT flag will be set to indicate to the debug monitor that context changing is taking place. Note, this is the flow path that an initial (i.e., a first) interrupt of a debug session will take to create the initial context. Once the context has been established, flow continues to block 745 where the current context is made available to the user 215 (and the NEW_HALT flag is unset).

A second option from decision 725 is a "Previous" breakpoint. In this example, a previous breakpoint represents a breakpoint that has been previously encountered during this debug session. Accordingly, there has previously been setup a context for this breakpoint. As indicated at block 730, the debug monitor may restore the previous context as the current context and make the now current context (i.e., the previous one from this breakpoint) available to the user 215. In this flow path, the NEW_HALT flag will be set to indicate to the debug monitor that context changing is taking place. Note, this is the flow path that returning from a lower level (e.g., higher priority code) breakpoint that had pre-empted a previously established breakpoint would follow. Once the context has been restored, flow continues to block 745 where the current context is made available to the user 215 (and the NEW_HALT flag is unset).

The third and final option from decision 725 in this example flow is a "Current" breakpoint. In this example, a current breakpoint represents a breakpoint that is still active but has been pre-empted from higher priority code (e.g., an RT ISR) while in a debug session (see block 760). Accordingly, the current context already matches this breakpoint and the NEW_HALT flag does not indicate that a context change must take place. Flow returns to block 745 to "continue" to make the current context available to user 215. Note, this is the flow path that returning from a lower level (e.g., higher priority code) that did not encounter any breakpoint but had pre-empted the halt of the "active" breakpoint would follow. That is, the higher priority code (e.g., an RT ISR) has caused the CPU to awaken and execute it (block 715) and then returned to the interactive debug state (blocks 745 and 750). This pre-emption is shown by the flow path through block 760. Note, that running a "single step" run command (or similar) would follow through either the new context path of block 735 in a case where the return of the limited run command resulted in a new breakpoint or would follow through the previous context path of block 730 if, in a limited set of circumstances, the return point of the limited run command happened to coincide with a point for which a previous context had already been created.

In all cases, after the current context is made available to user 215, the debug session enters an "interactive" phase as shown by block 750. Assuming no pre-emption takes place the CPU remains halted and the user may enter debug access requests (block 755) or debug run requests (block 765). If the user enters a debug access request (block 755), a determination is made as to whether or not higher priority code is currently executing as shown by decision 770. If no higher priority code is executing, flow continues to block 790 where the request will be serviced and respect the current context. However, if higher priority code is currently executing (the YES prong of decision 770), flow continues to block 775 where the type of request, e.g., rude or polite, the user has made is determined. If the request is rude, the flow continues to block 780 where the request is immediately serviced without respecting the current context. If the request is polite, then flow continues to block 785 where the request will be held for a period of time to wait for the higher priority code to complete prior to continuing to block 790 where the request can be serviced and honor the current context. As explained above, if the current context is not honored for the data access request, the user may be presented with information that is not consistent with the breakpoint they believe they are sitting at.

Returning to the discussion of the interactive session (block 750), the second type of request a user may make is a debug run request. This may be a) a step request asking the debugger to move forward in the "current" code by one step, or b) a "limited" run command that tells the debugger an amount of code to run (e.g., run X steps, run till Y address, etc.), or c) may be a simple "go" or "run" command to indicate that the breakpoint may be exited. In any of these cases, the CPU is allowed to execute (block 715) for the specified period of time and then return, if necessary, to the current breakpoint context (of course at the new run-time address). In the case, that no other breakpoints are encountered, flow will return to the interactive debug session block 750 through the path of a "current" breakpoint type at decision 725.

As shown in FIG. 7, so long as a debug run request is not issued, block 750 continues to be the "apparent" CPU system state from the perspective of the user 215, during which time the CPU can be responsive to RT ISRs (block 760) and user 215 can make data access requests. When user 215 does issue a debug run request following a breakpoint, this is reflected by the path from block 765 to block 715.

Figure 8:
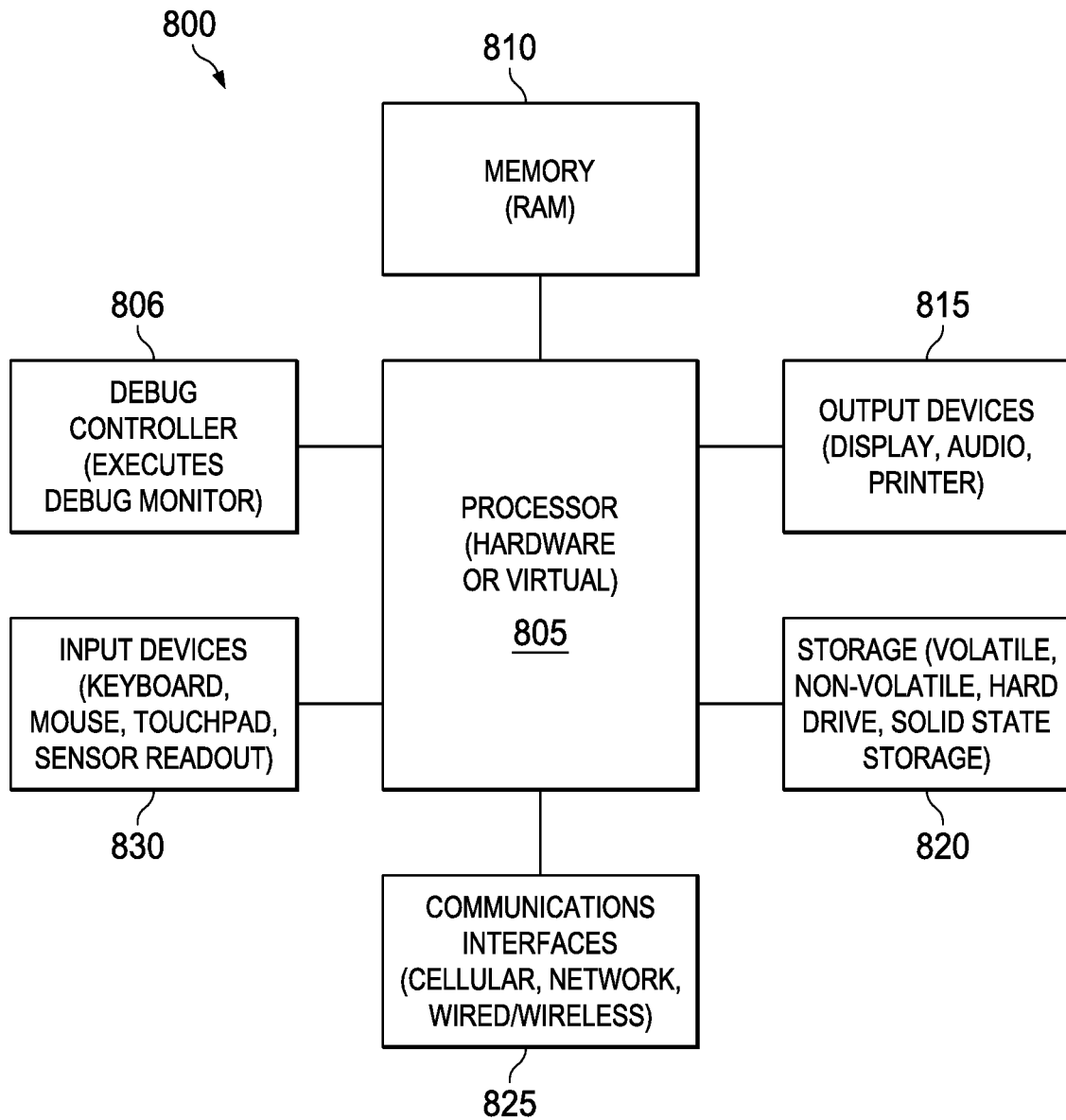
FIG. 8 illustrates a general purpose processor, shown without all possible elements of this disclosure, including a debug controller and a debug monitor in accordance with one or more disclosed example implementations.

Referring now to FIG. 8, a general purpose processor is illustrated (without all possible elements of this disclosure) including a debug controller 806 and a debug monitor in accordance with one or more disclosed example implementations. FIG. 8 illustrates a high-level block diagram of a computing device 800 (computing system) that may be used to implement one or more disclosed examples (e.g., an embedded processor as part of an embedded real-time system control device, a processor configured with an application to perform a debug session, etc.). For example, computing device 800, illustrated in FIG. 8, could represent a client device or a physical server device and could include either hardware or virtual processor(s) depending on the level of abstraction of the computing device. In some instances (without abstraction) computing device 800 and its elements as shown in FIG. 8 each relate to physical hardware and in some instances one, more, or all of the elements could be implemented using emulators or virtual machines as levels of abstraction. In any case, no matter how many levels of abstraction away from the physical hardware, computing device 800 at its lowest level may be implemented on physical hardware. As also shown in FIG. 8, computing device 800 may include one or more input devices 830, such as a keyboard, mouse, touchpad, or sensor readout (e.g., biometric scanner), communications port(s), and one or more output devices 815, such as displays, communication ports, speakers for audio, or printers. Some devices may be configured as input/output devices also (e.g., a network interface, communications port, or touchscreen display). Computing device 800 may also include communications interfaces 825, such as a network communication unit that could include a wired communication component and/or a wireless communications component, which may be communicatively coupled to processor 805. The network communication unit may utilize any of a variety of proprietary or standardized network protocols, such as Ethernet, TCP/IP, to name a few of many protocols, to effect communications between devices. Network communication units may also comprise one or more transceivers that utilize the Ethernet, power line communication (PLC), Wi-Fi, cellular, and/or other communication methods.

As illustrated in FIG. 8, computing device 800 includes a processing element, such as processor 805, that contains one or more hardware processors, where each hardware processor may have a single or multiple processor cores. Computing device 800 may include a debug controller 806 that may be configured to execute a debug monitor (e.g., as illustrated as element 256 of FIG. 2) according to one or more disclosed implementation. Debug controller 806 may be implemented as part of the same IC as processor 805 or may be on a separate but communicatively coupled IC.

In one example, the processor 805 may include at least one shared cache that stores data (e.g., computing instructions) that are utilized by one or more other components of processor 805. For example, the shared cache may be a locally cached data stored in a memory for faster access by components of the processing elements that make up processor 805. In some cases, the shared cache may include one or more mid-level caches, such as level 8 (L2), level 3 (L3), level 4 (L4), or other levels of cache, a last level cache (LLC), or combinations thereof. Examples of processors include, but are not limited to a central processing unit (CPU) microprocessor. Although not illustrated in FIG. 8, the processing elements that make up processor 805 may also include one or more other types of hardware processing components, such as graphics processing units (GPUs), application specific integrated circuits (ASICs), field-programmable gate arrays (FPGAs), and/or digital signal processors (DSPs).

FIG. 8 illustrates that memory 810 may be operatively and communicatively coupled to processor 805. Memory 810 may be a non-transitory medium configured to store various types of data. For example, memory 810 may include one or more storage devices 820 that comprise a non-volatile storage device and/or volatile memory. Volatile memory, such as random access memory (RAM), can be any suitable non-permanent storage device. The non-volatile storage devices 820 can include one or more disk drives, optical drives, solid-state drives (SSDs), tap drives, flash memory, read-only memory (ROM), and/or any other type memory designed to maintain data for a duration time after a power loss or shut down operation. In certain instances, the non-volatile storage devices 820 may be used to store overflow data if allocated RAM is not large enough to hold all working data. The non-volatile storage devices 820 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 805. In one instance, the compiling process of the software program may transform program code written in a programming language to another computer language such that the processor 805 is able to execute the programming code. For example, the compiling process of the software program may generate an executable program that provides encoded instructions (e.g., machine code instructions) for processor 805 to accomplish specific, non-generic, particular computing functions.

After the compiling process, the encoded instructions may then be loaded as computer executable instructions or process steps to processor 805 from storage 820, from memory 810, and/or embedded within processor 805 (e.g., via a cache or on-board ROM). Processor 805 may be configured to execute the stored instructions or process steps in order to perform instructions or process steps to transform the computing device into a non-generic, particular, specially programmed machine or apparatus. Stored data, e.g., data stored by a storage device 820, may be accessed by processor 805 during the execution of computer executable instructions or process steps to instruct one or more components within the computing device 800.

A user interface (e.g., output devices 815 and input devices 830) can include a display, positional input device (such as a mouse, touchpad, touchscreen, or the like), keyboard, or other forms of user input and output devices. The user interface components may be communicatively coupled to processor 805. When the output device is or includes a display, the display can be implemented in various ways, including by a liquid crystal display (LCD) or a cathode-ray tube (CRT) or light emitting diode (LED) display, such as an organic light emitting diode (OLED) display. Persons of ordinary skill in the art are aware that the computing device 800 may comprise other components well known in the art, such as sensors, powers sources, and/or analog-to-digital converters, not explicitly shown in FIG. 8.

Certain terms have been used throughout this description and in the claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors. The terms configured and configurable are closely related. In the context of this disclosure, the term configured may be used to indicate that an item may be preset to operate in a default manner but does not necessarily mean that the item may not be changed and "re-configured" during operation. The term "configurable" may be used to specifically indicate that an item may not be pre-set with any particular default condition but is likely (but not required) to change at run-time, during operation, or at some point in its existence.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A computing device comprising:
   a processing unit; and
   a debug controller communicatively coupled to the processing unit and including an input/output interface,
   wherein the debug controller contains logic that causes the debug controller to perform a debug monitor function, the debug monitor function configured to:
      respond to a first debug event for the processing unit in a first code section having a first execution priority, in part, by pausing the processing unit at a point in the first code section;
      establish a first debug context;
      receive a request for debugging information relative to the first debug event via the input/output interface of the debug controller;
      determine a type of the request for debugging information;

receive an indication that a second code section of a higher execution priority than the first execution priority requests servicing while the processing unit is halted at the point in the first code section and prior to servicing the request for debugging information based on the type of the request;

allow the processing unit to resume execution to service the second code section while maintaining the first debug context, wherein the request for debugging information is serviced based on the type of the request; and return to an execution state consistent with the first debug context, in part, by pausing the processing unit in the first code section upon completion of servicing the second code section.

2. The computing device of claim 1, wherein:
the type of the request for debugging information is one of rude or polite.

3. The computing device of claim 2, wherein:
in response to type of the request for debugging information being rude, the debug controller services the request for debugging information prior to the processing unit completing execution of the second code section.

4. The computing device of claim 2, wherein:
in response to the type of the request for debugging information being polite, the debug monitor services the debug access request after the processing unit completes execution of the second code section.

5. The computing device of claim 1, wherein:
in response to receiving the request for debugging information, during the servicing of the second code section, holding the at least one information access request for a timeout period.

6. The computing device of claim 5, wherein the debug monitor function is further configured to:
service the request for debugging information during the timeout period, if servicing the second code section is complete; and
provide a message via the input/output interface if the request for debugging information is not serviced.

7. The computing device of claim 6, wherein:
the message requests an override.

8. The computing device of claim 7, wherein the debug monitor function is further configured to:
receive the override via the input/output interface.

9. The computing device of claim 8, wherein the debug monitor function is further configured to:
service the request for debugging information during the servicing of the second code section in response to receiving the override.

10. The computing device of claim 1, wherein:
the request for debugging information is in the first code section.

11. The computing device of claim 1, wherein:
the first debug event includes one of a breakpoint in the first code section, a trigger received at the input/output interface, a user command received at the input/output interface, or a watch-point in the first code section.

12. A method of debugging program code executing on a processor configured with a debug controller performing a debug monitor function, the program code including a plurality of code sections, each code section associated with an execution priority level, the method comprising:

executing a first code section having a first execution priority on the processor;

recognizing a first debug event in the first code section at the debug controller;

establishing a first debug context;

pausing execution of the processor at a point in the first code section;

receiving a request for debugging information relative to the first debug event via an input/output interface of the debug controller;

determining a type of the request for debugging information;

receiving an indication that a second code section of a higher execution priority than the first execution priority requests servicing while the processor is halted at the point in the first code section and prior to servicing the request for debugging information based on the type of the request;

allowing the processor to resume execution to service the second code section while maintaining the first debug context, wherein the request for debugging information is serviced based on the type of the request; and returning to an execution state consistent with the first debug context, in part, by pausing the processor in the first code section upon completion of servicing the second code section.

13. The method of claim 12, wherein:
the type of the request for debugging information is one of rude or polite.

14. The method of claim 13, wherein:
in response to type of the request for debugging information being rude, servicing the request for debugging information prior to the processor completing execution of the second code section.

15. The method of claim 13, wherein:
in response to the type of the request for debugging information being polite, servicing the debug access request after the processor completes execution of the second code section.

16. The method of claim 12, wherein:
in response to receiving the request for debugging information, during the servicing of the second code section, holding the request for debugging information for a timeout period.

17. The method of claim 16, wherein:
servicing the request for debugging information during the timeout period, if servicing the second code section is complete; and
providing a message via the input/output interface if the request for debugging information is not serviced.

18. The method of claim 17, wherein:
the message requests an override.

19. The method of claim 18, wherein:
in response to receiving the override, servicing the request for debugging information during the servicing of the second code section.

20. The method of claim 12, wherein:
the first debug event includes one of a breakpoint in the first code section, a trigger received at the input/output interface, a user command received at the input/output interface, or a watch-point in the first code section.

* * * * *